Figure 1:
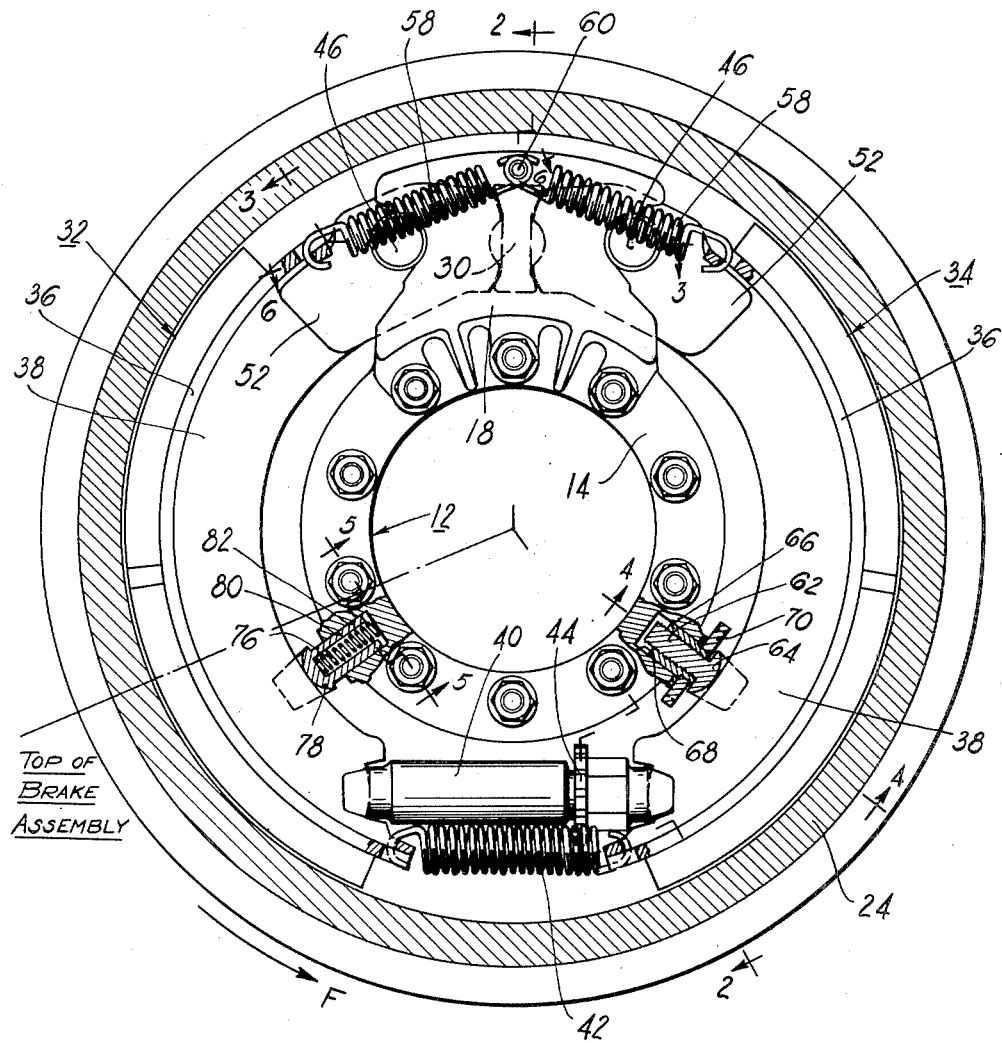
Figure 2:
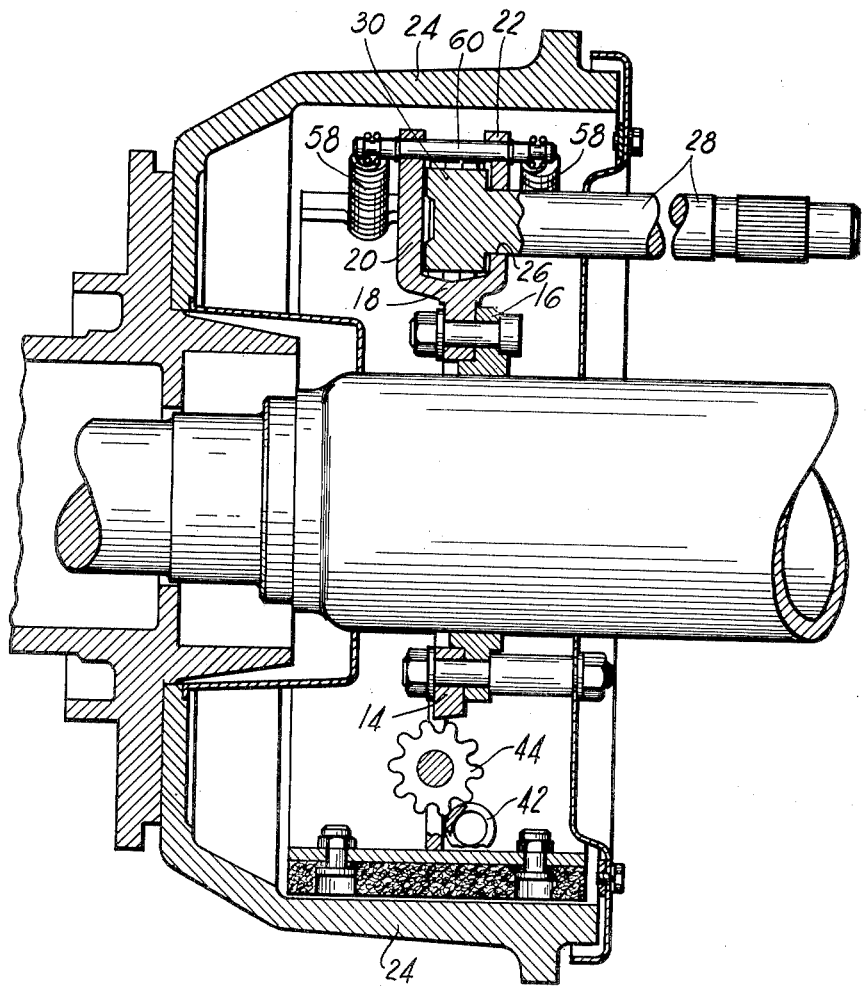
Figure 3:
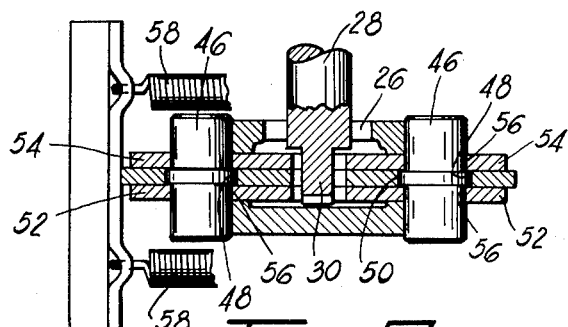

Nov. 13, 1956 W. E. WHITE 2,770,327
BRAKE ASSEMBLY

Filed Sept. 13, 1950 3 Sheets—Sheet 1

INVENTOR.
WILLIAM E. WHITE
BY
T. J. Plante
ATTORNEY

Nov. 13, 1956  W. E. WHITE  2,770,327
BRAKE ASSEMBLY

Filed Sept. 13, 1950  3 Sheets-Sheet 2

INVENTOR.
WILLIAM E. WHITE
BY
T. J. Plante
ATTORNEY

Nov. 13, 1956 W. E. WHITE 2,770,327
BRAKE ASSEMBLY
Filed Sept. 13, 1950 3 Sheets—Sheet 3

INVENTOR.
WILLIAM E WHITE
BY
T. J. Plante
ATTORNEY

United States Patent Office 2,770,327
Patented Nov. 13, 1956

2,770,327

BRAKE ASSEMBLY

William E. White, South Bend, Ind., assignor to Bendix Aviation Corporation, South Bend, Ind., a corporation of Delaware Application September 13, 1950, Serial No. 184,574

9 Claims. (Cl. 188—78)

This invention relates to a brake assembly, and particularly to the construction and arrangement of the brake shoes and the support member which anchors and positions the shoes.

The general object of the invention is to provide a brake which is both rugged enough to serve as a heavy duty brake and simple enough to be manufactured for a reasonable cost. This object is achieved by obtaining a maximum number of functions from individual parts of the brake assembly, thereby reducing the total number of parts. For example, the usual shoe holddowns and backing plate ledges have been eliminated, and yet the shoes are retained solidly and squarely in position at all times.

A more specific object of the invention is to provide, in a brake of the type having a full-wrapping friction element, the combination of a radially-adjustable shoe-positioning device which engages the floating portion of the friction element with a separate radially-yieldable device which urges the friction element into engagement with the adjustable shoe-positioning device, and also prevents grabbing due to drum deflection.

Another specific object of the invention is to provide a rigid anchor which prevents lateral tilting of the shoe (or shoes), in addition to taking the torque of the shoes during application. In order to accomplish this dual purpose, each shoe has a laterally-extending anchor pin supported in its anchoring end and arranged to engage two axially-spaced anchor projections on the support member.

The above and other objects and features of the invention will appear more fully hereinafter from a consideration of the following description, taken in connection with the accompanying drawings, wherein an embodiment of the invention is illustrated by way of example. In the drawings:

Figure 1 is a side elevation of my improved brake assembly, certain parts of the brake being shown in section; and Figures 2, 3, 4, 5, and 6 are sectional views taken on the lines 2—2, 3—3, 4—4, 5—5, and 6—6, respectively, of Figure 1.

As illustrated in the drawings, the support member 12 of the brake assembly has an annular body portion 14 which is bolted to the axle housing flange 16, and an anchor portion 18 consisting of two axially-spaced aligned projections 20 and 22 which extend outwardly toward the brake drum 24. The inner anchor projection 22 has an oblong slot 26, through which an actuating shaft 28 extends. The actuating shaft has a flattened end portion 30 which is located between the ends of the shoes and which acts as a shoe-spreading cam when the shaft 28 is rotated.

Two arcuate T-section brake shoes 32 and 34 are supported on the spider 12, each shoe comprising a lined rim 36 and a strengthening web 38. The ends of the shoes opposite the anchor 18 are interconnected by means of a floating adjustable strut 40 and a tension spring 42. The use of such an adjustable strut is conventional in brakes of this type, the arrangement being such that rotation of serrated wheel 44 varies the length of the strut, thereby changing the total length of the full-wrapping friction element, which includes both shoes. Increasing the length of the friction element reduces the drum clearance, thereby compensating for lining wear.

The anchoring end of each brake shoe carries an anchor pin 46, which extends transversely through the shoe web. The pin has an enlarged diameter portion 48 midway between its ends, the enlarged portion being located in an opening 50 in the shoe web. Plates 52 and 54 are secured to opposite sides of the shoe web for the purpose of retaining the anchoring pin and also strengthening the web. The ends of the pin extend through openings 56 in the respective plates and are urged to engage the spaced anchor projections 20 and 22 by tension springs 58, two of which are connected between each shoe and a post 60 supported by the anchor projections.

The shoe-mounted anchor pins 46 serve a double purpose. They divide the anchoring torque between the two anchor projections 20 and 22, thereby avoiding the tendency to twist the anchor which is present in offset anchoring arrangements. They also provide means for holding the shoes "squarely" in position when the brake is released, thereby facilitating accurate adjustment of the shoes. In other words, the laterally-extending anchor pins prevent cocking, or twisting, of the shoes by holding their rims parallel to the brake drum.

The direction of rotation of the drum when the vehicle is moving forward is counterclockwise, as indicated by the arrow F. Therefore, during forward braking the shoe 34 is the anchored, or secondary, shoe, and the shoe 32 is the applying, or primary, shoe. During reverse braking, shoe 32 is the anchored shoe, and shoe 34 is the applying shoe.

Because the ends of the shoes opposite the anchor are capable of floating inside the drum circle, means should be provided for holding the unanchored ends of the shoes in the proper position when the brake is released. To do this, and at the same time compensate for drum deflection, or distortion, during brake application, I provide two shoe-positioning devices, one in engagement with each of the shoes near its unanchored end.

Figure 4:
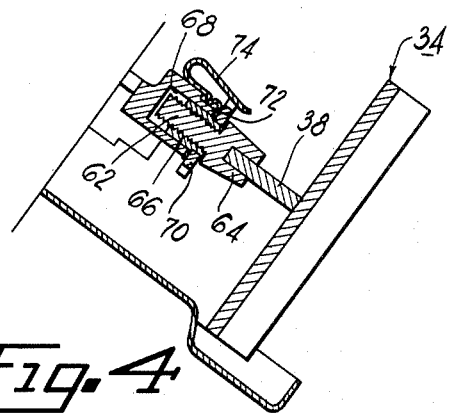
Figure 5:
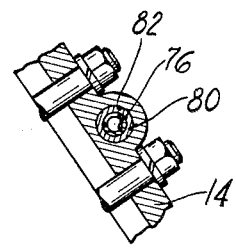
Figure 6:
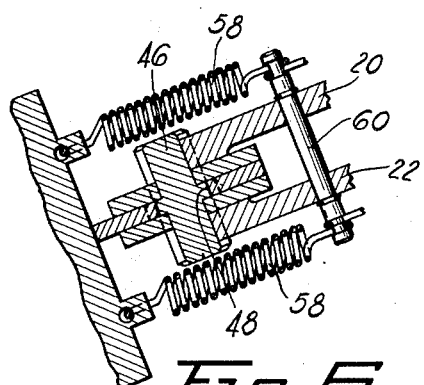

One of the shoe-positioning devices comprises a shoe-engaging member having a threaded stem 62 and a slotted head 64. The web of shoe 34 fits into the slotted head, to be laterally guided thereby, and engages the bottom of the slot in released position. The threaded stem 62 is screwed into an internally threaded sleeve 66, which is free to rotate in a radially-extending bore 68 provided in support member 12. A serrated head 70 is secured to the sleeve 66 to serve as a tool-engaging member, so that the sleeve may be rotated to adjust the position of the brake shoes. As shown in Figure 4, the inner surface of head 70 engages a metal plate 72, which in turn engages the portion of support member 12 which surrounds the bore 68. Metal plate 72 has an integral arm 74 which acts as a locking spring, cooperating with the teeth of head 70 to yieldably resist rotation of the head. It is apparent that rotation of sleeve 66 will move the stem 62 radially to adjust the position of shoes 34 and 32 with respect to the drum.

Shoe 34 is normally held against slotted head 64 by means of a compression spring 76, which is part of a second shoe-positioning device. This positioning is accomplished as follows: The spring 76 exerts a radial force on shoe 32; this force is also exerted in the same magnitude and direction on shoe 34 since the two shoes are interconnected and coplanar. The described force of spring 76 tends to rotate shoe 34 clockwise about the pin 46 and against the slotted head 64. The second shoe-positioning device includes a shoe-engaging member having a slotted head 78 which engages the web of shoe 32 and a sleevelike stem 80 which is slidable in a radially-extending bore 82 provided in support member 12. Spring 76 is supported on the bottom of bore 82, and acts on the head 78 to urge it and shoe 32 toward the drum. Although the shoe actuating cam 30 is shown at the top of Figure 1, in actual installation the brake assembly is frequently mounted so that the actuating cam 30 lies more nearly on the horizontal centerline of the brake (with respect to the ground) than on the vertical centerline (see the notation "Top of Brake Assembly" in Figure 1). With the usual vehicle installation, the spring 76 provides vertical support for the weight of the unanchored portion of the floating friction element.

During forward braking the point of maximum pressure between the shoes and the drum is at a point on the secondary shoe 34 near the radius which passes through the point of engagement of slotted head 64 with the web of shoe 34. Theoretically, the point of maximum pressure is the intersection of the inner drum circumference with the radius which is perpendicular to the radius passing through the anchoring axis of shoe 34, i. e. through the center of the anchoring pin 46 carried by shoe 34. Because the pressure of the secondary shoe tends to deflect the drum, a heavy application might pinch shoe 32 between the drum and head 78, were it not for the fact that head 78 can move inwardly against the force of spring 76. When the braking force is relieved, spring 76 returns the unanchored ends of the shoes to the proper location, which is determined by the adjustable shoe-engaging device 62—64.

From the foregoing description, it is seen that the two shoe-position devices accomplish several functions. Member 62—64 adjusts the position of the shoes in the brake assembly. The spring associated with member 78—80 urges shoe 34 into engagement with member 62—64 and also provides a yieldable resistance to inward movement of shoe 32, allowing drum deflection at this point without causing the shoe to grab. The slotted heads 64 and 78 provide guides for the shoes preventing lateral displacement, and, in cooperation with the anchor pins 46, constitute the positioning and supporting means for the shoes.

Although a particular embodiment of my invention has been described, it will be understood by those skilled in the art that the objects of the invention may be attained by the use of constructions different in certain respects from that disclosed without departing from the underlying principles of the invention.

I claim:

1. A brake assembly comprising a support member having a shoe-anchoring portion which is located at one side of the support member and which consists of two outwardly-extending axially-spaced aligned projections, two arcuate T-section brake shoes, one of which anchors on said projections in one direction of rotation, and the other of which anchors on said projections in the other direction of rotation, each shoe having a transversely-extending anchor pin mounted in its anchoring end and arranged to engage simultaneously both of said projections, an adjustable strut operatively interconnecting the ends of the shoes opposite the shoe-anchoring projections, a first shoe-positioning member which engages one of the shoes near its strut-connected end and which is slotted to receive and thereby laterally position the shoe web, said first shoe-positioning member having a threaded connection with the support member which provides adjustment of the position of the shoe, and a second shoe-positioning member which engages the other shoe near its strut-connected end and which is slotted to receive and thereby laterally position the shoe web, said second shoe-positioning member having a radially-yieldable connection with the support member which permits inward movement of the shoe under the influence of drum distortion.

2. A brake assembly comprising a support member having a shoe-anchoring portion which consists of two axially-spaced aligned projections, two arcuate T-section brake shoes, one of which anchors on said projections in one direction of rotation, and the other of which anchors on said projections in the other direction of rotation, each shoe having a transversely-extending anchor pin supported on its anchoring end and arranged to engage simultaneously both of said projections, means operatively interconnecting the ends of the shoes opposite the shoe-anchoring projections, a first shoe-positioning member which engages one of the shoes at a point remote from its anchoring end and which is slotted to receive and thereby laterally position the shoe web, said first shoe-positioning member having an adjustable connection with the support member which provides radial adjustment of the position of the shoe, and a second shoe-positioning member which engages the other shoe at a point remote from its anchoring end and which is slotted to receive and thereby laterally position the shoe web, said second shoe-positioning member having a radially-yieldable connection with the support member which permits inward movement of the shoe during a brake application.

3. A brake assembly comprising a supporting member having two axially-spaced anchor projections, two brake shoes, one of which anchors on said projections in one direction of rotation, and the other of which anchors on said projections in the other direction of rotation, each shoe having a transversely-extending anchor pin supported on its anchoring end and arranged to engage simultaneously both of said projections, a first shoe-positioning member which engages one of the shoes at a point remote from its anchoring end and which is so constructed as to assist in laterally positioning the shoe web, said first shoe-positioning member having an adjustable connection with the support member which provides adjustment of the position of the shoe, and a second shoe-positioning member which engages the other shoe at a point remote from its anchoring end and which is so constructed as to assist in laterally positioning the shoe web, said second shoe-positioning member having a yieldable connection with the support member which permits inward movement of the shoe during a brake application.

4. A brake assembly comprising a support member having two axially-spaced anchor projections, a brake shoe having a transversely-extending anchor pin supported on its anchoring end and arranged to engage simultaneously both of said projections, and a shoe-positioning member which engages the shoe at a point remote from its anchoring end and which is so constructed as to assist in laterally positioning the shoe web, said shoe-positioning member having an adjustable connection with the support member which provides adjustment of the position of the shoe.

5. A brake assembly comprising a support member having two axially-spaced anchor projections, a brake shoe having a transversely-extending anchor pin supported on its anchoring end and arranged to engage simultaneously both of said projections, and a shoe-positioning member which engages the shoe at a point remote from its anchoring end and which is so constructed as to assist in laterally positioning the shoe web, said shoe-positioning member having a yieldable connection with the support member which permits inward movement of the shoe during a brake application.

6. A brake comprising a support member, a full-wrapping friction element consisting of two shoes and a floating adjustable strut operatively connecting the shoes at one side of said support member, anchoring and applying means associated with the ends of the shoes opposite the floating strut, said support member having two radially-extending openings located near the strut-connected ends of the respective shoes, a first shoe-positioning member having a sleevelike body portion slidably mounted in one of the support member openings and having a slotted head portion which embraces the web of one of the shoes, a compression spring which extends into the sleevelike body portion of the shoe-positioning member and which engages the support member to yieldably urge the shoe outwardly, a second shoe-positioning member having an externally-threaded body portion and having a slotted head portion which embraces the web of the other shoe, and an adjusting member comprising an internally-threaded sleeve rotatably mounted in the other support member opening and in threaded engagement with the second shoe-positioning member.

7. A brake comprising a support member, a full-wrapping friction element consisting of two shoes and a floating strut operatively connecting the shoes at one side of said support member, anchoring and applying means associated with the ends of the shoes opposite the floating strut, said support member having two radially-extending openings located near the strut-connected ends of the respective shoes, a first shoe-positioning member having a body portion slidably mounted in one of the support member openings and having a slotted head portion which embraces the web of one of the shoes, a spring which urges the shoe-positioning member outwardly into engagement with the shoe but which permits inward movement of the shoe during a brake application, a second shoe-positioning member having a body portion extending into the other support member opening and having a slotted head portion which embraces the web of the other shoe, and an adjustable connection between the second shoe-positioning member and the support member, by means of which the position of the friction element can be varied.

8. A brake comprising a support member, a friction element including two shoes which are operatively interconnected at one side of said support member, anchoring means associated with the ends of the shoes at the other side of the brake assembly, a first shoe-positioning member which engages one of the shoes at a point spaced from its anchoring end and which is so constructed as to assist in laterally positioning the shoe web, said first shoe-positioning member having a radially-yieldable connection with the support member which permits inward movement of the shoe during a brake application, and a second shoe-positioning member which engages the other shoe at a point spaced from its anchoring end and which is so constructed as to assist in laterally positioning the shoe web, said second shoe-positioning member having an adjustable connection with the support member which provides radial adjustment of the position of the shoe.

9. A brake comprising a support member, a friction element including two shoes which are operatively interconnected at one side of said support member, anchoring means associated with the ends of the shoes at the other side of the brake assembly, a first shoe-positioning member which engages one of the shoes at a point spaced from its anchoring end and which has a yieldable connection with the support member permitting inward movement of the shoe during a brake application, and a second shoe-positioning member which engages the other shoe at a point spaced from its anchoring end and which has an adjustable connection with the support member which provides radial adjustment of the position of the shoe.

References Cited in the file of this patent
UNITED STATES PATENTS 1,871,441   Bendix _____ Aug. 16, 1932